(12) United States Patent
Breitmaier

(10) Patent No.: US 8,199,542 B2
(45) Date of Patent: Jun. 12, 2012

(54) METHOD AND DEVICE FOR CREATING A DIRECT VOLTAGE OR A DIRECT CURRENT

(76) Inventor: Max Breitmaier, Uerikon (CH)

( * ) Notice: Subject to any disclaimer, the term of this patent is extended or adjusted under 35 U.S.C. 154(b) by 310 days.

(21) Appl. No.: 12/449,100

(22) PCT Filed: Feb. 1, 2008

(86) PCT No.: PCT/EP2008/051299
§ 371 (c)(1),
(2), (4) Date: Jul. 23, 2009

(87) PCT Pub. No.: WO2008/095875
PCT Pub. Date: Aug. 14, 2008

(65) Prior Publication Data
US 2010/0067274 A1    Mar. 18, 2010

(30) Foreign Application Priority Data
Feb. 5, 2007  (EP) .................................... 07101724

(51) Int. Cl.
*H02M 7/00* (2006.01)
(52) U.S. Cl. ...................................... 363/125
(58) Field of Classification Search ............. 363/34, 363/65, 123, 125–127, 131
See application file for complete search history.

(56) References Cited

U.S. PATENT DOCUMENTS

| | | | | |
|---|---|---|---|---|
| 3,701,939 A | * | 10/1972 | Petersen et al. | 363/136 |
| 4,151,446 A | * | 4/1979 | Ludloff | 315/241 R |
| 4,853,836 A | * | 8/1989 | Furuhashi | 363/58 |
| 5,272,613 A | * | 12/1993 | Buthker | 363/21.1 |
| 5,731,969 A | | 3/1998 | Small | |
| 5,917,715 A | * | 6/1999 | Lee | 363/21.04 |
| 6,459,213 B1 | * | 10/2002 | Nilssen | 315/224 |
| 7,426,119 B2 | * | 9/2008 | Tsuruya | 363/16 |
| 7,825,765 B2 | * | 11/2010 | Kawasaki et al. | 336/212 |
| 7,956,491 B2 | * | 6/2011 | Ochi et al. | 307/17 |

FOREIGN PATENT DOCUMENTS

| | | |
|---|---|---|
| DE | 725 045 | 9/1942 |
| DE | 32 43 337 A1 | 5/1984 |
| DE | 39 01 792 A1 | 8/1990 |
| EP | 0 844 728 A2 | 5/1998 |

OTHER PUBLICATIONS

Kremser, Andreas; "Grundzuge elektrischer Maschinen and Antriebe;" 1997; pp. 47-52 and 71-73; Germany.
Oberholzer, R.; "Konstruktion elektrischer Maschinen;" 1979; pp. 1-2; Germany.
"Betriebsverhalten eines Transformators (Versuch TR);" pp. 1-16; Germany.

* cited by examiner

*Primary Examiner* — Adolf Berhane
(74) *Attorney, Agent, or Firm* — Oliff & Berridge, PLC

(57) ABSTRACT

A device, which functions to generate a DC voltage or a DC current, has at least one rectifier element (D) and at least one transformer (T) that has at least one primary winding (W1) connected through leads (PL1, PL2) of a power supply lead (PL) to an AC voltage source (Q) and has at least one secondary winding (W2) connected to a load (Z), the windings being disposed on an associated magnet frame (JK) that functions to carry a magnetic flux Φ. According to the invention, the primary winding (W1) is connected through the rectifier element (D) to the AC voltage source (Q) such that for each AC half-wave of corresponding polarity a current I1 is able to be carried through the rectifier element (D) and through the primary winding (W1), the current driving the magnetic flux Φ always in the same direction through the magnet frame (JK).

13 Claims, 8 Drawing Sheets

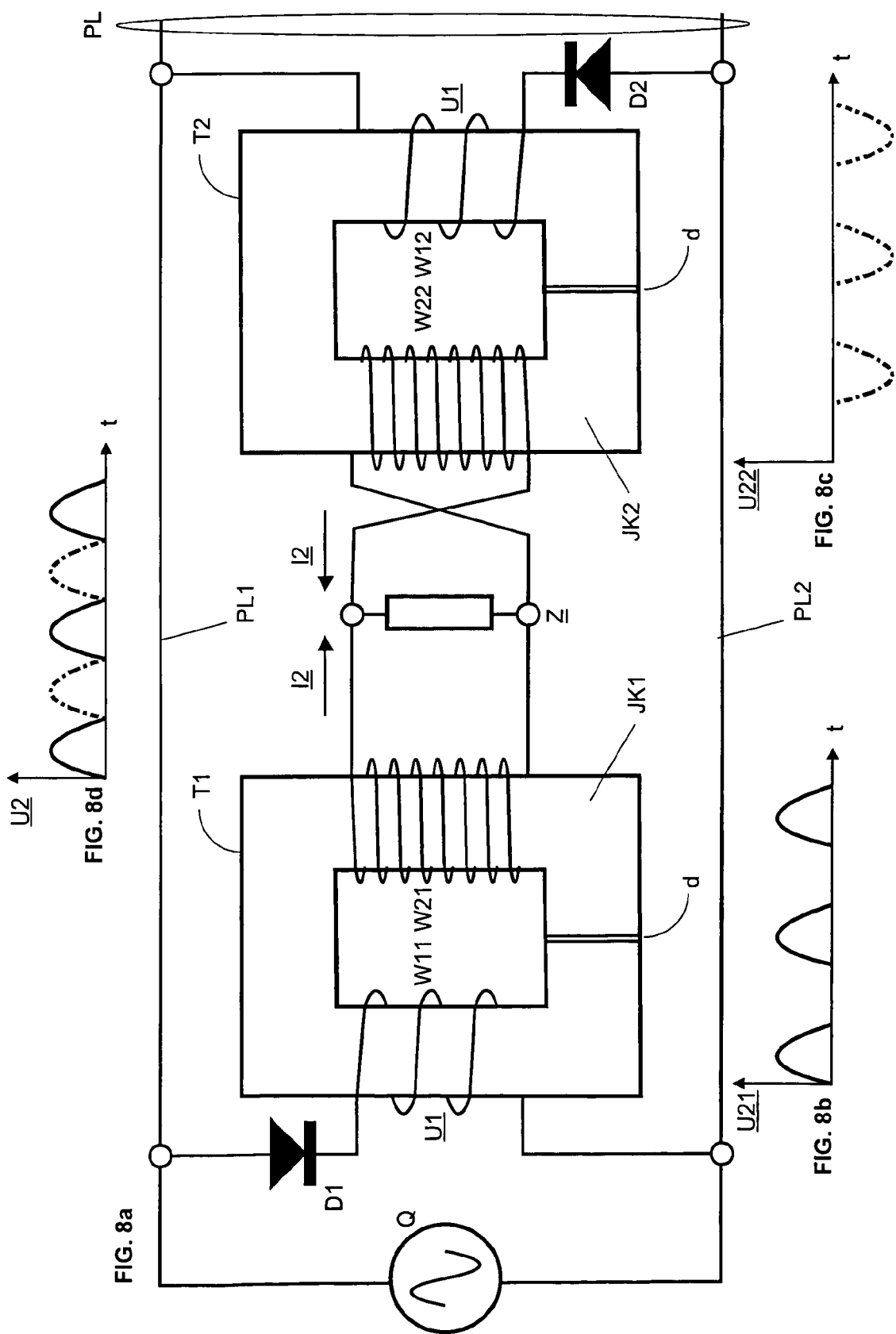

METHOD AND DEVICE FOR CREATING A DIRECT VOLTAGE OR A DIRECT CURRENT

The invention relates to a device and to a corresponding method functioning to generate a DC voltage or a DC current, the device being equipped with a transformer.

According to Andreas Kremser, *Grundzüge elektrischer Maschinen and Antriebe* [Principles of Electrical Machines and Drive Systems] [1], Teubner Verlag, Stuttgart, 1997, page 47, generator transformers that transform generator voltage to transmission voltage are located at the beginning of the transmission path. What are known as grid coupling transformers are employed at network nodes. The grid coupling transformers are often implemented as autotransformers. The distribution transformers function to supply the end users with power from the medium-voltage power grid (power levels from 50 kVA to 2,500 kVA, high voltage being from 3.6 to 24 kV and low voltage being predominantly 400 V, with a maximum of 1.1 kV). Small transformers for supplying instrumentation and control equipment are primarily of single-phase construction (power levels of a few VA up to a few kVA, high voltage being predominantly 230/400 V).

FIG. 3 illustrates a vector diagram of a transformer operating at no load (see also [1], page 52, illustration 3.4 and [2], R. Oberholzer, *Konstruktion elektrischer Maschinen, I. Transformatoren* [Design of Electrical Machines, I. Transformers], Zentralschweizerisches Technikum, Luzern 1979). An AC voltage U1 applied to an off-load transformer drives an excitation current $I_{10}$ through the primary winding of the transformer. Excitation current $I_{10}$ is composed of two components, specifically, the magnetizing current $I_M$ and the core-loss current $I_{FE}$. Magnetization current $I_M$, which lags AC current U1 by 90°, is in phase with the magnetic flux Φ in the magnet frame that typically is constructed out of wound limbs or cores. Core-loss current $I_{FE}$ is in phase with AC voltage U1.

The product of AC current U1 and core-loss current $I_{FE}$ is the core power loss that is composed of hysteresis losses and eddy current losses. The product of magnetization current $I_M$ and the number of turns N1 of the primary winding W1 yields a first primary magnetomotive force(also magnetic potential) $Φ_0$ that drives the magnetic flux $Φ_0$ through the magnetic circuit. Magnetic flux $Φ_0$ is interlinked with primary winding W1 and secondary winding W2 of the transformer and generates voltages E1 and E2 in these windings. Voltage E1 resulting at the primary winding is in opposition to applied voltage U1 by 180° and is reduced by the voltage drop $I_{10}$*Z1 (Z1 is the impedance of the primary winding). In power transformers, the voltage drop $I_{10}$*Z1 amounts to only 0.3%-1% of terminal voltage U1 and is disregarded below. FIG. 3 thus represents a simplified vector diagram of the transformer in no-load operation.

When an impedance Z is connected to secondary winding W2 of the transformer, as illustrated in FIG. 1, a secondary current I2 flows in secondary winding W2. The secondary current I2 is driven by voltage E2, induced in secondary winding W2, through the secondary circuit.

Secondary current I2 together with windings N2 of the secondary winding W2 form a secondary magnetic magnetomotive force $θ_2$. The secondary magnetic magnetomotive force $θ_2$ generates a secondary magnetic flux $Φ_2$ that counteracts magnetic flux $Φ_0$ generated on the primary side and seeks to cancel out this flux. In order to preclude this, a compensation current I2' must flow in primary winding W1 in addition to the no-load current I10. The compensation current produces an additional primary magnetomotive force $θ_1$ that generates an additional primary magnetic flux $Φ_1$. In order to ensure that an equilibrium results for the two magnetomotive forces $θ_1$ and $θ_2$, and magnetic fluxes $Φ_1$ and $Φ_2$ cancel out. The applicable relation for compensation current I2' is: I2'=I2*N2/N1. As a result, what remains is magnetic flux $Φ_0$ that is produced by first primary magnetomotive force $θ_0$, as illustrated in FIG. 4.

Leakage fluxes caused by load currents I2 and I2', which are kept as low as possible through appropriate measures, are disregarded for the treatment below.

The parameters present during resistive-inductive loading of the transformer are illustrated in FIG. 5. The passage of secondary current I2 through load impedance Z produces secondary terminal voltage U2. Due to the voltage drop across the ohmic resistor of secondary winding W2 and the leakage reactance drop, the secondary terminal voltage U2 is smaller than induced secondary voltage E2 that together with the induced primary voltage E1 lags magnetic flux $Φ_0$ by 90°.

The processes of connecting a transformer operating at no load to the infinite system are described in [1], chapter 3.10.1, pages 72 and 73.

The voltage equation for the transformer operating at no load is $$u_1 = R_1 i_1 + L_1 di_1/dt.$$

The steady-state solution of this first-order differential equation with sinusoidal disturbance variable $$u1(t) = \sqrt{2} U_N \sin(ωt)$$

is $$Φ_{STAT}(t) = Φ_N 1/Z_0 (R_1 \sin(ωt) - X_1 \cos(ωt))$$

or $$Φ_{STAT}(t) = Φ_N \sin(ωt - ω_0)$$

where $\tan ω_0 = (X_1/R_1)$

Immediately after switching, however, the flux must be zero, Φ(0)=0, such that the solution outside of the steady-state still contains a transient component or compensation element:

$$Φ(t) = Φ_{STAT}(t) + Φ_N X_1/Z_0 * e^{-t/τ}$$

The compensation element $Φ_N * X_1/Z_0 * e^{-t/τ}$ decays with time constant τ, where $τ = L_1/R_1$.

Since $R_1 \ll X_1$, the maximum value reached after the first half-cycle is approximately double the value of the steady-state flux.

$$Φ_{max} \approx 2 * Φ_N$$

According to [3], *Betriebsverhalten eines Transformators (Versuch TR), D-ITET, Professur für Leistungselektronik und Messtechnik, Fachgruppe Antriebs- und Magnetiagertechnik der ETH Zürich* [Operational Behavior of a Transformer (Test TR), D-ITET, Professorship for Power Electronics and Measurement Instrumentation of Zurich Technical University] (see http://www.eek.ee.ethz.ch/student/fachpraktikum-mavt/anleitungen/TR.pdf) when a transformer is connected to the grid, the automatic circuit breakers are sometimes triggered automatically when no load is connected to the secondary side. Further, according to [3], due to the phase shift between applied voltage U1 and magnetic flux Φ, it is advantageous to connect the transformer at the moment of the voltage maximum or minimum at which flux Φ equals zero. This is because flux Φ is coupled to the stored magnetic energy and therefore cannot vary abruptly. If, on the other hand, the connection is made at voltage zero, flux Φ does not start at the maximum value of $Φ_{max}$ but starts at Φ=0, and then climbs after a half cycle to a maximum of ±2Φ. The total flux deviation is determined by the voltage time integral. As a result, the core moves far into saturation with a correspondingly high magnetization current $I_M$. After a brief period, the transient decays and the transformer transitions to a steady state, as described in [1], page 73.

What is critical for the treatment below is that these disturbing turn-on transients be prevented in practice to the greatest extent possible, appropriate measures being described in [3] (for example, precisely timed switching on at the voltage maximum using switches).

According to [1], page 1, rectifiers and transformers are used to convert electrical energy. Conversion of AC current to AC current is effected by transformers. Conversion of AC current to DC current is effected by rectifiers. What follows from these statements is that the rectifiers are always connected on the output side of the transformers, i.e., at their secondary side. This means that the AC voltage is converted first by a transformer and only then rectified by a rectifier.

Large currents at low voltages are required for various applications, e.g., in resistance welding equipment or in electroplating equipment. In the reverse situation, small DC currents at high voltage are required, e.g., in dust filtering equipment. Specially cooled semiconductors are required to convert an AC current to a large DC current. High voltages for semiconductors result in significant problems in terms of insulation and present significant requirements relative to the reverse voltages of the semiconductors. High loads on the semiconductors, or the effect of disturbances such as overvoltages, sometimes lead to defects in the semiconductors. Under certain circumstances these defects can result in the destruction of entire semiconductor group, and thus cause very significant consequences in terms of cost that can be within the order of magnitude for the cost of the incoming-side-connected transformer.

In addition, for many applications and individual user requirements, a large number of different semiconductors is required to effect rectification, which in each case constitute the last element in the chain of units which function to convert electrical energy. The multiplicity of various semiconductor modules accordingly results in high production, inventory, distribution, and maintenance costs.

The fundamental problem to be solved by this invention is to create a device functioning to generate a DC voltage or a DC current and to provide a method by which the above described disadvantages can be precluded.

In particular, a purpose is to create a device functioning to generate a DC voltage or DC current by which the conversion of electrical energy can be implemented in an especially advantageous manner.

In addition, another purpose is to create a device functioning to generate a DC voltage or DC current by which the conversion of electrical energy that is supplied by a power source through one or more phase conductors can be implemented advantageously.

In addition, the device according to the invention should provide the ability to use semiconductor rectifiers of a few different designs in a wide range of applications.

In addition, the semiconductor rectifiers are better protected against load-side disturbances.

This problem is solved by a device and a method that have the features indicated in Claims 1 and 13, respectively. Advantageous embodiments of the invention are provided in the remaining claims.

The device that functions to generate a DC voltage or DC current has at least one rectifier element, preferably a controllable rectifier element, for example, a thyristor or a triac, and at least one transformer having at least one primary winding and at least one secondary winding.

The at least one primary winding, which is connected through leads from a single-phase or multi-phase power supply line to an AC voltage source, and the at least one secondary winding connected to a load, are disposed on an associated magnet frame functioning to conduct a magnetic flux $\Phi$. The frame is implementable in any desired known design having a corresponding number of yokes and cores that form at least one magnetic circuit.

According to the invention, the at least one primary winding is connected through the rectifier element to the AC voltage source, with the result that for each AC voltage source half-wave of corresponding polarity a primary current I1 is able to be carried by the rectifier element through primary winding. The primary current I1 always drives magnetic flux $\Phi$ in the same direction through the magnet frame or the magnetic circuit implemented therein.

With each half-wave of corresponding polarity, the transformer or the primary winding is connected by the optionally controlled semiconductor element to the power supply system. This enables a primary current to flow that corresponds at least approximately to the inrush current, i.e., depending on the complete or partial relaxation of the steady-state machine or transformer, which relaxation results between the two half-waves of identical polarity. This means that the energy stored in the magnet frame or in the core, as well as in the air gap, is released during the emergence of the unused half-wave to the extent the transformer has returned to the state before transmission of the half-wave.

The magnetic energy stored in the air gap increases the reactive power but is nevertheless released in almost lossless fashion. Based on the selection of dimensions for the air gap, it is, on the other hand, possible to affect in the desired manner the field strength HFE appearing across the core and the resulting remanence BR. The characteristic of the transformer is sheared or linearized as the field strength requirement, and thus the magnetization current, increases when an air gap is used. Thus, an interaction exists between the air gap and the magnetization current that allows the turn-on transients and thus the turn-off transients of the transformer to be modified advantageously.

In the method according to the invention when using a diode as the rectifier element, this element conducts or "switches" shortly after the zero passage of the AC voltage half-wave. The magnetic flux $\Phi$ starts at $\omega=0$ and rises after a half cycle to a maximum of $\pm 2\omega$. The total flux deviation is determined by the voltage time integral. What also results is a doubling of the parameters measured in the secondary circuit. The air gap can be appropriately sized so as to ensure that the core, with the correspondingly high magnetization current $I_M$, does not move into saturation. Due to the distances between the half-waves of identical polarity, the transformer does not transition to a state that, in the conventional operation of transformers, is identified as a steady state.

The diode conducts until primary current I1, or the sum of magnetization current $I_M$ and the compensation current I2', becomes zero. Since the diode blocks after the zero passage of primary current I1 and does not transmit the second half-wave, a pulsating DC current is transmitted. What results on the secondary side are half-waves of secondary current I2 and of secondary voltage U2, which always have the same polarity.

According to the invention, both half-waves can be transmitted preferably over separate magnetic circuits and supplied to a load. If two transformer sections, each of which conducts only half the current, are interconnected in phase, then the two pulse sequences complete each other to form a pulsating DC current. However, since only co-directional half-waves are transmitted per transformer section, only half the nominal currents flow in the transformer sections and generate only ¼ the losses (Pv=(I/2)^2*R) for the same conductor cross-section. The sum of the unit ratings of both transformer sections is thus smaller than the unit rating of a corresponding standard transformer.

If the gaps between pulses on the other hand are sufficiently large, instead of two transformer sections only one transformer can be used that has two primary windings, each transmitting a half-wave of correct polarity.

The solution according to the invention can also be applied especially advantageously in the case of multi-phase systems. Here again, only one half-wave or both half-waves can be transmitted per phase. Thus, a voltage with significantly reduced ripple appears on the secondary side.

The solution according to the invention can be employed in transformers of various designs and power ratings. For example, EI, UI, or 3UI lamination shapes can be employed.

The solution according to the invention has numerous advantages. Generation of a DC voltage is effected by simple measures and by using transformer properties that are advantageous for this purpose. Specifically, by using the turn-on characteristic that up until now has been viewed as disadvantageous. What is furthermore especially advantageous is that the semiconductor rectifiers are decoupled by the transformer from the user side and are thus both better protected and also more advantageously selectable. In particular, the semiconductor rectifiers can be standardized within a small number of types since identical or similar conditions are always present on the primary side. Adaptation to the multifarious requirements of the user is selectable through appropriate sizing or wiring of the winding elements of the transformer. What is furthermore especially advantageous is that the magnitude and polarity of the secondary-side-generated DC voltage is easily adjustable by simple means, i.e., by switching the transformation ratio or by reversing the polarity of the windings.

The solution according to the invention can furthermore be advantageously employed in any power range. In the range of very high power ratings, the fabrication costs, and in particular also maintenance costs can be significantly reduced for electronic power equipment.

The following discussion describes the invention in more detail based on the drawings.

Figure 2A:
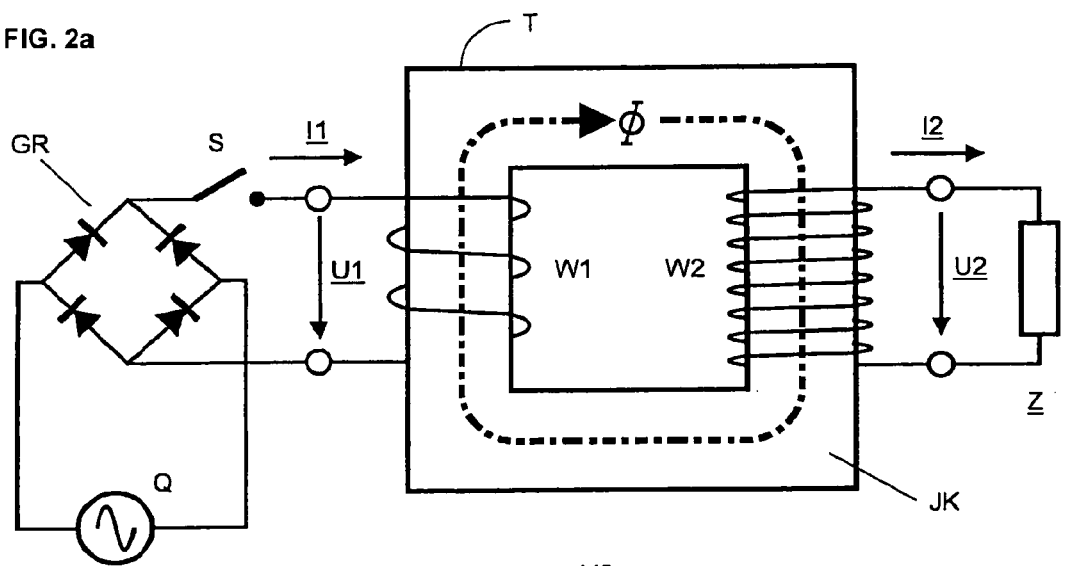
FIG. 2 shows transformer T of FIG. 1 including a rectifier bridge GR that feeds a pulsating DC voltage U1 through a switch S to primary winding W1 of transformer T.
Figure 2B:
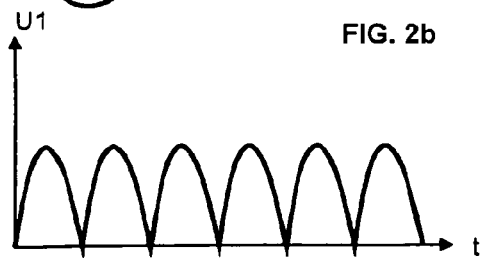
Figure 2C:
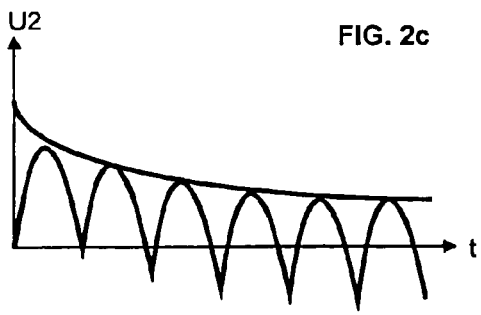

FIG. 2*a* shows the pulsating DC voltage delivered by rectifier bridge GR of FIG. 2.

FIG. 2*b* shows the transition of secondary voltage U2 to a steady state after switch S of FIG. 2 is closed.

Figure 1:
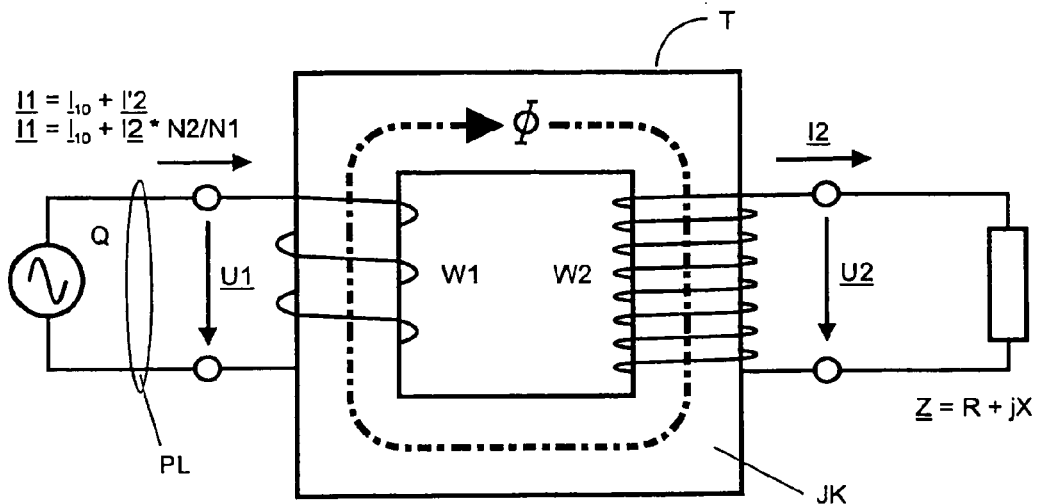
FIG. 1 shows a transformer T, the primary winding W1 of which is connected to an AC voltage source Q, and the secondary winding W2 of which is connected to a load Z.
Figure 3:
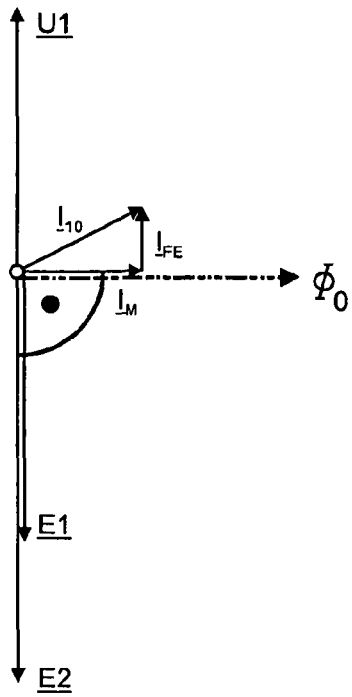

FIG. 3 is a simplified vector diagram illustrating transformer T of FIG. 1 in no-load operation.

Figure 4:
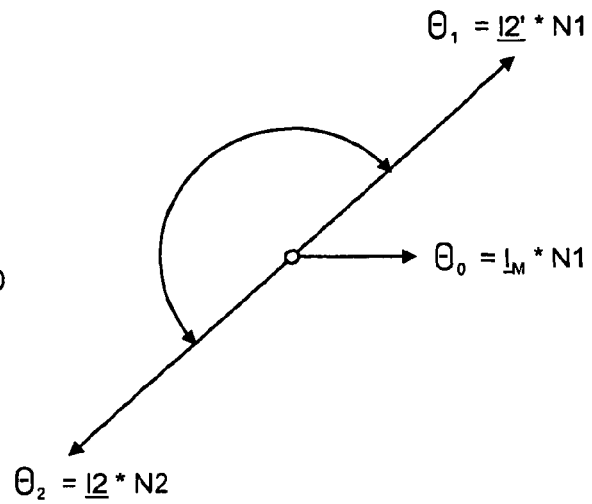

FIG. 4 shows magnetomotive forces $\theta_0$, $\theta_1$, and $\theta_2$ of transformer T of FIG. 1 under load.

Figure 5:
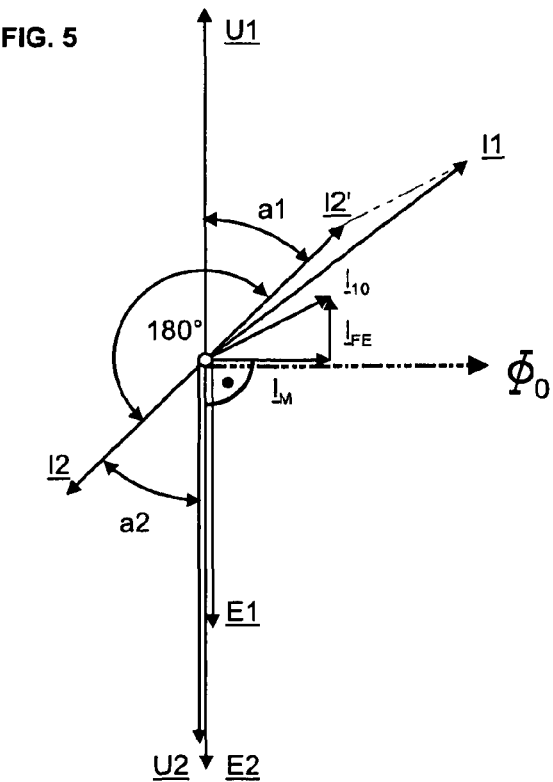

FIG. 5 is a simplified vector diagram illustrating transformer T under resistive-inductive load.

Figure 6B:
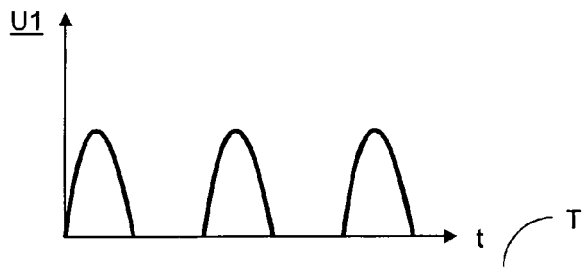
Figure 6C:
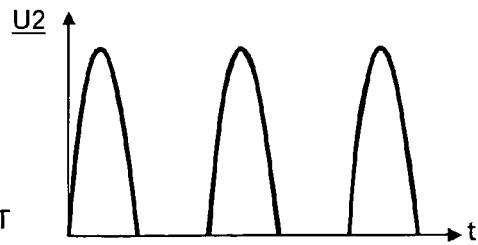
Figure 6A:
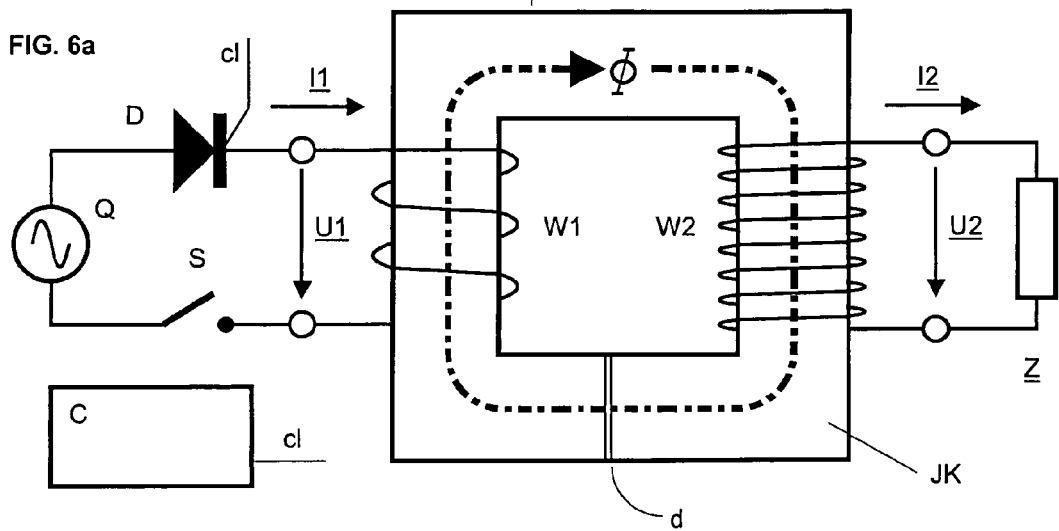

FIG. 6 shows a device according to the invention comprising transformer T of FIG. 1, having controllable rectifier element D through which AC voltage half-waves U1 of identical polarity are fed across switch S to primary winding W1 of transformer T.

Figure 7A:
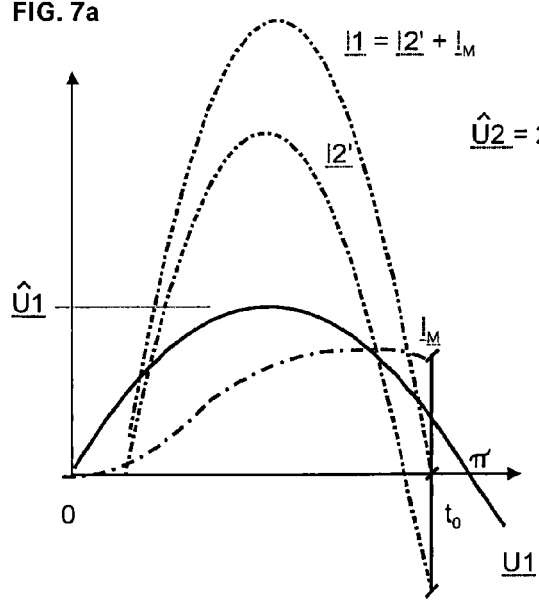

FIG. 7*a* shows the characteristic curve for primary voltage U1 and for primary current I1 transmitted within the positive half-wave, which current is composed of magnetization current $I_M$ and compensation current I2'.

Figure 7B:
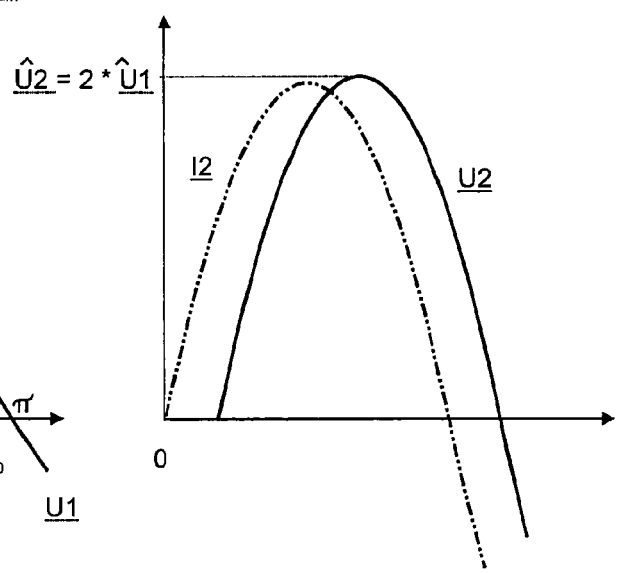

FIG. 7*b* shows the characteristic curve corresponding to primary current I1 for secondary voltage U2 and secondary current I2.

FIG. 8 shows a device according to the invention comprising two transformers T1, T2, in which primary windings $W_{11}$ and $W_{12}$ are each connected through a rectifier element D1, D2 to AC voltage source Q, and in which secondary windings $W_{21}$ or $W_{22}$ are connected to load Z such that secondary currents I2 conducted in alternating fashion for the associated half-waves run through load Z in the same direction.

Figure 9:
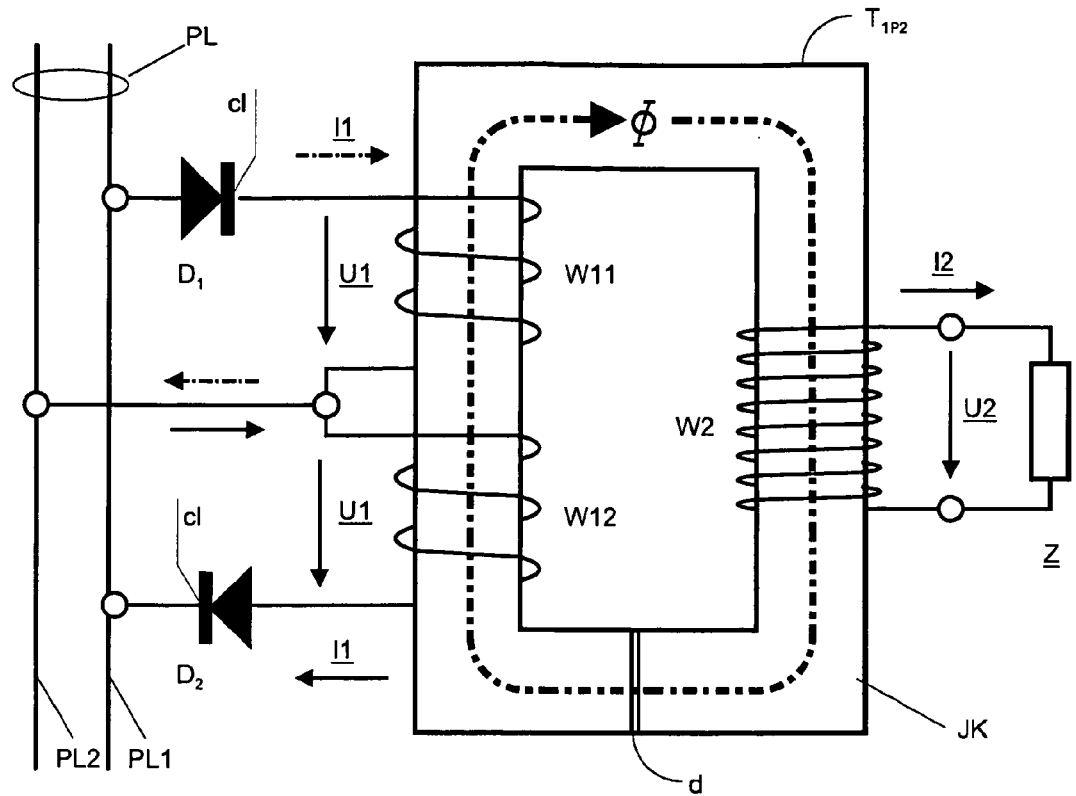

FIG. 9 shows a device according to the invention comprising a transformer $T_{1P2}$ having two primary windings $W_{11}$, $W_{12}$ provided on a common iron core, each winding connected to AC voltage source Q through one rectifier element D1 or D2 and disposed on the common magnet frame JK of transformer $T_{1P2}$ in such a way, that one primary current I1 is conducted within each primary winding $W_{11}$, $W_{12}$ in alternating fashion with each AC voltage half-wave of corresponding polarity, and the current driving associated magnetic flux Φ through magnet frame JK in each case is in the same direction.

Figure 10:
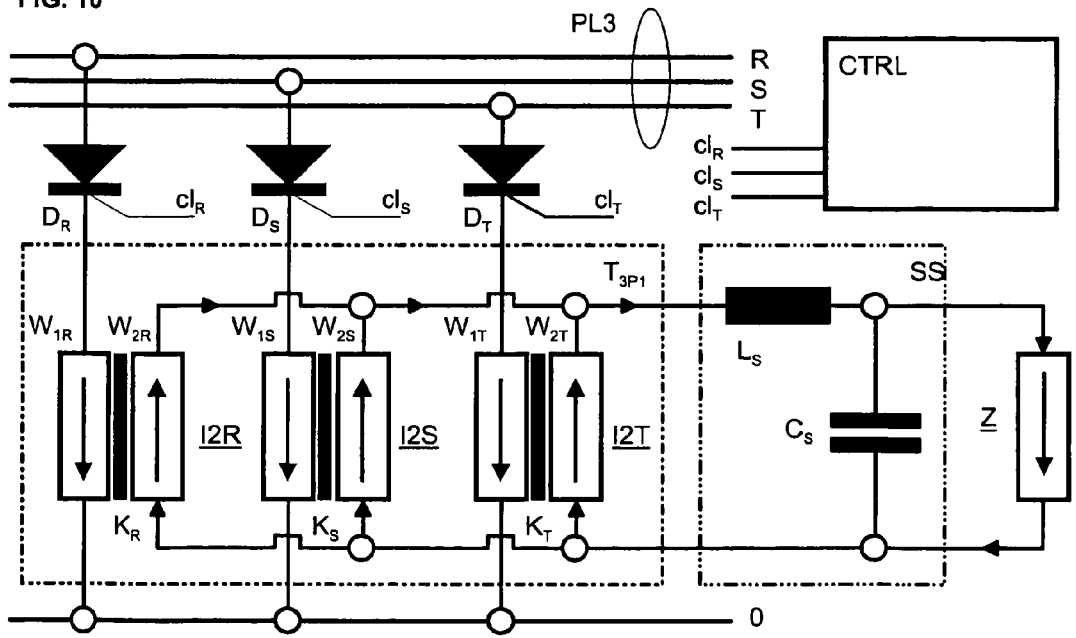

FIG. 10 shows a device according to the invention comprising a transformer $T_{3P1}$ having three primary windings $W_{1R}$, $W_{1S}$, $W_{1T}$, each first end of which is connected through associated rectifier element $D_R$ or $D_S$ or $D_T$ to a phase R, S, T, and the second end of which is connected to the neutral conductor 0 of the three-phase lead PL3 and to secondary windings $W_{2R}$, $W_{2S}$, $W_{2T}$, which are connected to load Z such that secondary currents $I_{2R}$, $I_{2S}$, and $I_{2T}$ carried in alternating fashion in secondary windings $W_{2R}$, $W_{2S}$, $W_{2T}$ always run through load Z in the same direction.

Figure 11A:
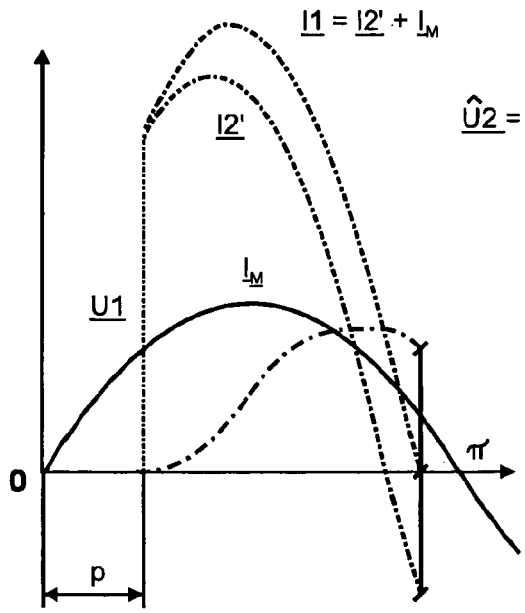

FIG. 11*a* shows the characteristic curve for primary voltage U1 set by phase-fired control and the corresponding primary current I1.

Figure 11B:
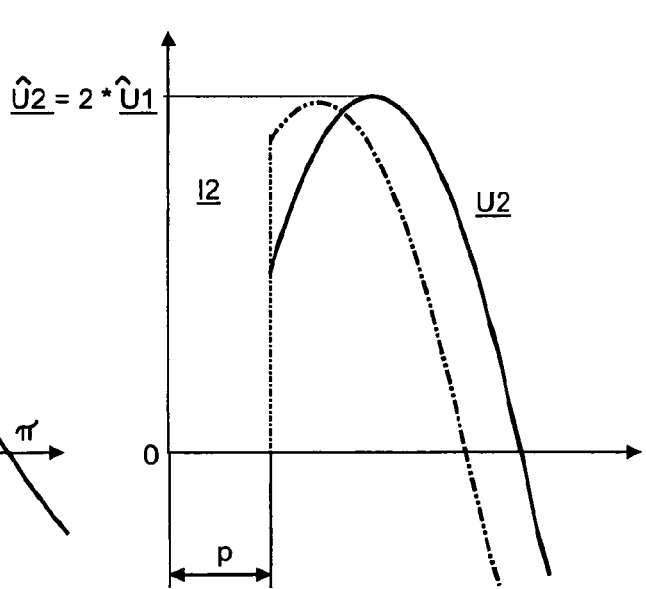

FIG. 11*b* shows the characteristic curve corresponding to primary current I1 of FIG. 11*a* for secondary voltage U2 and secondary current I2.

Figure 12B:
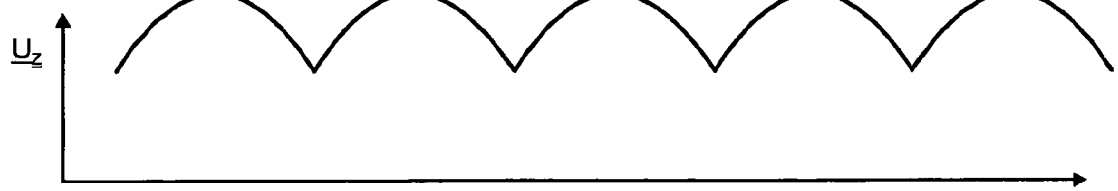
Figure 12A:
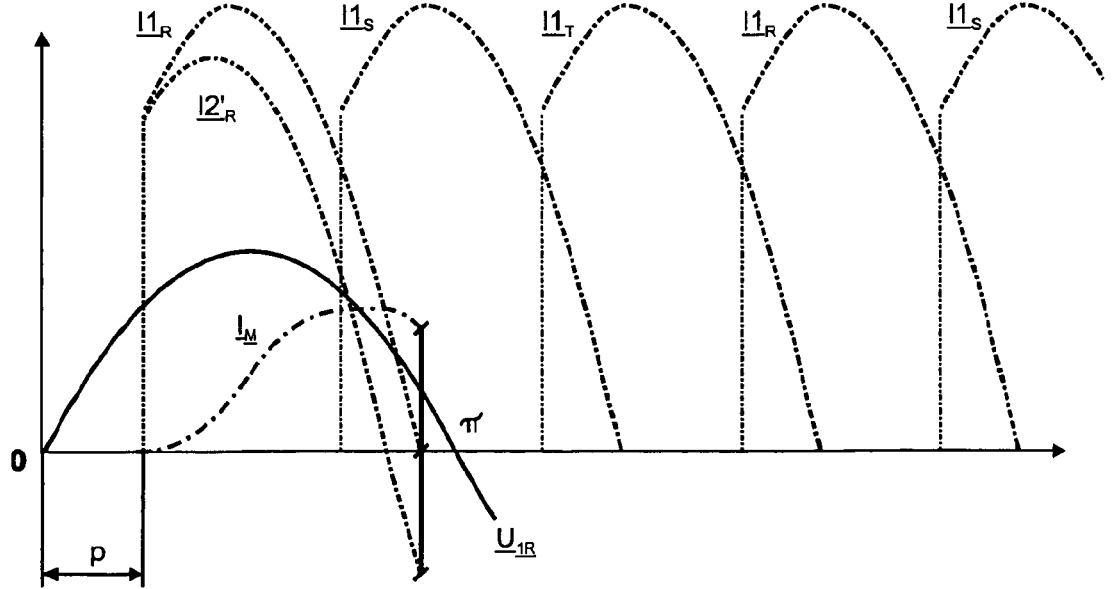

FIG. 12*a* shows the characteristic curve for primary currents $I_{1R}$, $I_{1S}$, $I_{1T}$ set by phase-fired control in primary windings $W_{1R}$, $W_{1S}$, $W_{1T}$ of transformer $T_{3P1}$ shown in FIG. 10.

FIG. 12*b* shows the characteristic curve for voltage U2 across load resistance Z shown in FIG. 10.

Figure 13:
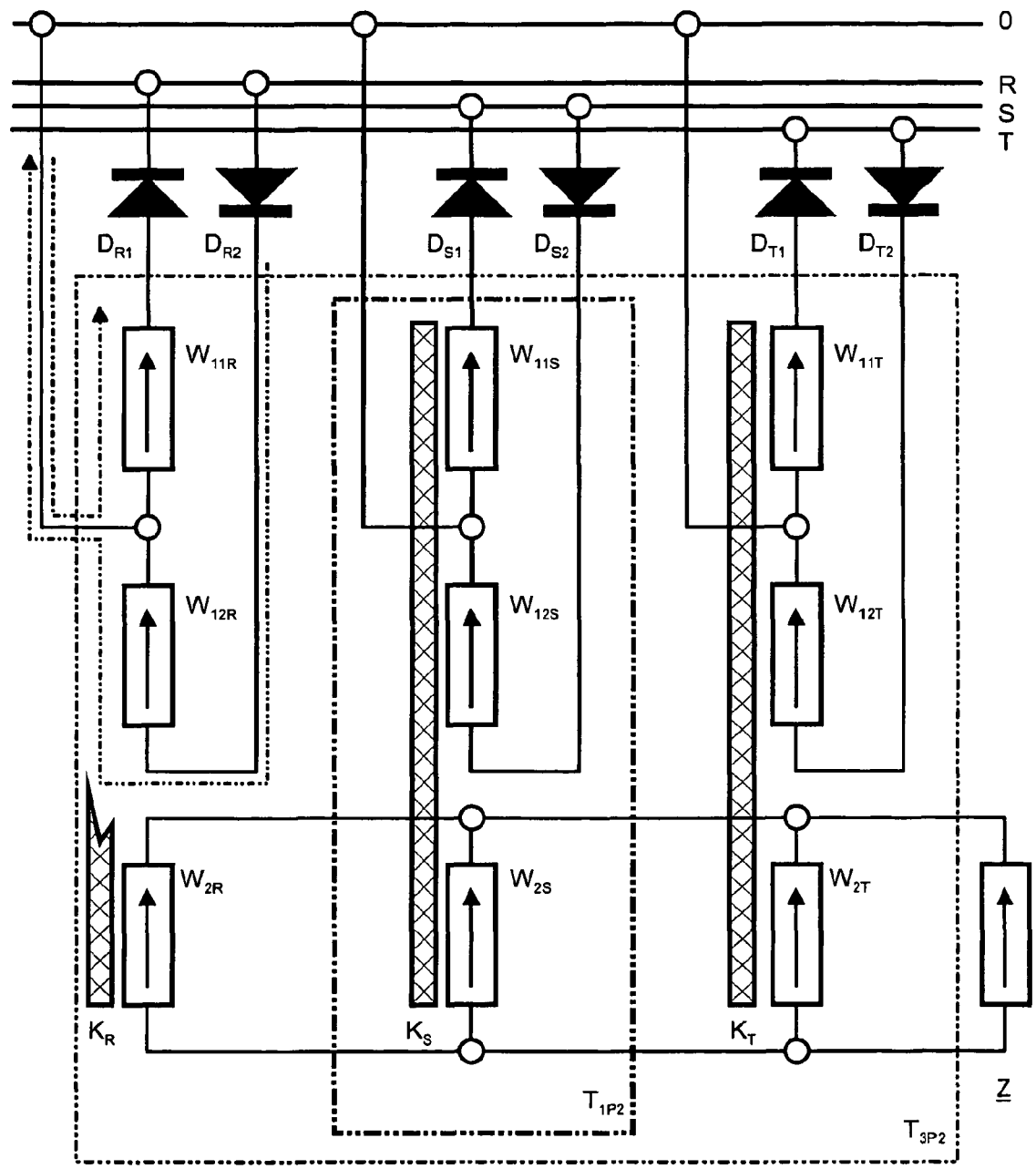

FIG. 13 shows a device according to the invention comprising transformer $T_{3P2}$ having three pairs of primary windings $W_{11R}$, $W_{12R}$ or $W_{11S}$, $W_{12S}$ or $W_{11T}$, $W_{12T}$, each first end of which is connected through associated rectifier element $D_{R1}$; $D_{R2}$ or $D_{S1}$; $D_{S2}$ or $D_{T1}$; $D_{T2}$ to a phase R, S, T, and the second end of which is connected to the neutral conductor 0 of three-phase lead PL3 and to secondary windings $W_{2R}$, $W_{2S}$, $W_{2T}$, which are connected to load Z such that secondary currents $I_{2R}$, $I_{2S}$, and $I_{2T}$ carried in alternating fashion in secondary windings $W_{2R}$, $W_{2S}$, $W_{2T}$ always run through load Z in the same direction.

Figure 14B:
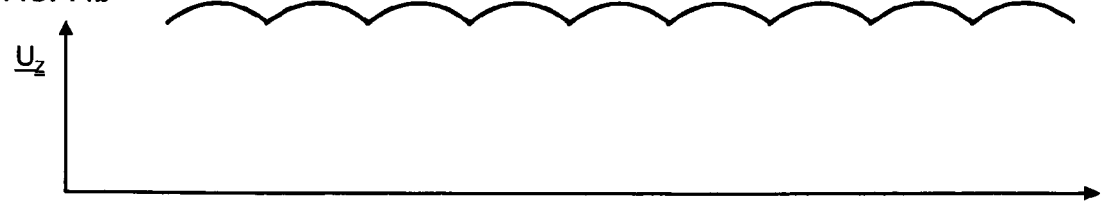
Figure 14A:
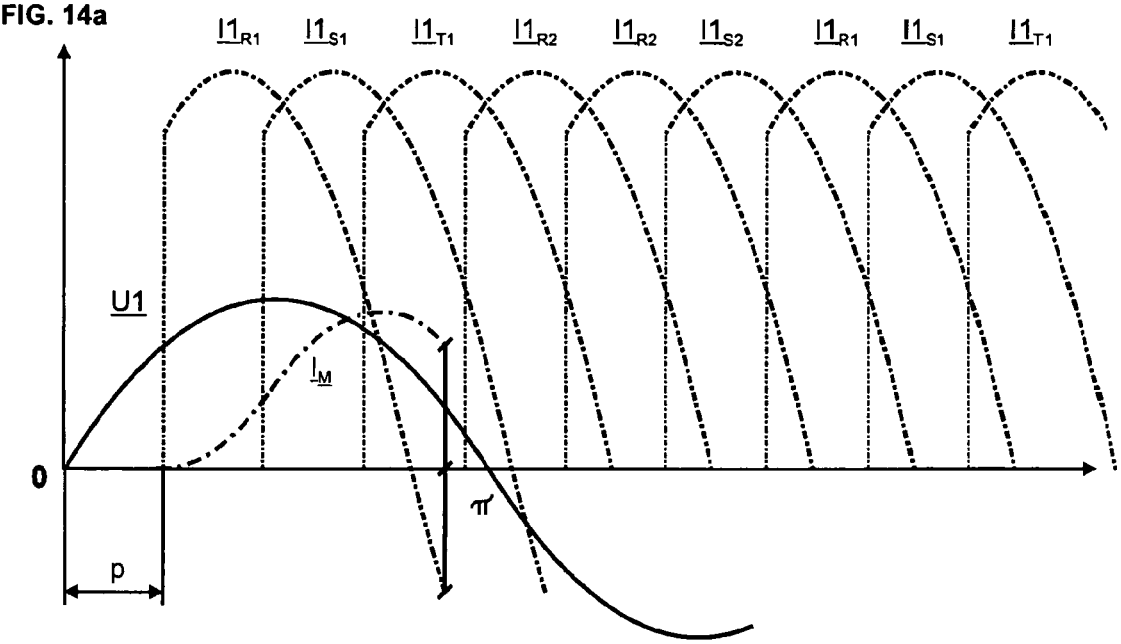

FIG. 14*a* shows the characteristic curve for primary currents $I1_{R1}$, $I1_{S1}$, $I1_{T1}$, $I1_{R2}$, $I1_{S2}$, $I1_{T2}$ set by phase-fired control in primary windings $W_{11R}$, $W_{12R}$ or $W_{11S}$, $W_{12S}$ or $W_{11T}$, $W_{12T}$ of transformer $T_{3P2}$ shown in FIG. 13.

FIG. 14*b* shows the characteristic curve for voltage $U_Z$ across load resistance Z shown in FIG. 13.

FIG. 1 shows transformer T, the primary winding W1 of which is connected to an AC voltage source Q, and the secondary winding W2 of which is connected to a load Z. The functional principle of this transformer T was described in the introduction based on FIGS. 3, 4 and 5. The vector diagram of FIG. 7 is especially relevant for understanding the following invention. The diagram shows that primary current I1 is essentially composed of magnetization current $I_M$ and compensation current I2' functioning to effect compensation of secondary current I2, these currents varying in terms of phase position.

FIG. 2 shows transformer T of FIG. 1, comprising a rectifier bridge GR that feeds the pulsating DC voltage U1 shown in FIG. 2a to primary winding W1 of transformer T after switch S is closed.

FIG. 2b illustrates how a similarly pulsating voltage U2 is generated on the secondary side by means of the primary-side-applied pulsating DC voltage U1. The DC voltage component of voltage U2 decays by a time constant T=L1/R1 that is a function of the inductance L1 and the resistance R1 of primary winding W1.

Thus, it is obvious that no usable DC voltage can be generated on the load side by the device shown in FIG. 2.

FIG. 6 shows a device according to the invention comprising transformer T of FIG. 1 and comprising a rectifier element D through which AC voltage half-waves U1 of identical polarity can be fed to primary winding W1 of transformer T whenever switch S is closed. Thus, during a half-wave of corresponding polarity, primary current I1 is fed through rectifier element D and through primary winding W1. The primary current I1 becomes equal to zero as soon as magnetization current $I_M$ and compensation current I2' functioning to effect compensation of secondary current I2 cancel each other out. After this instant (I1=0), rectifier element D blocks until the onset of the next half-wave of corresponding polarity and does not conduct until the onset of the next half-wave.

If controllable rectifier elements D are provided, these can be controlled by the control unit CTRL (see FIG. 10) in such a way that the phase of the half-wave to be transmitted is cut off or individual half-waves are periodically omitted or completely omitted if required. This enables the energy output and/or the gaps between transmitted half-waves to be controlled so as to move transformer T into a suitable operating state, for example, so as to allow for the complete delivery of the magnetic energy W stored in transformer T.

AC voltage half-waves U1, within which rectifier element D conducts, are naturally spaced by half a wavelength for which no current is carried by rectifier element D.

However, during the time in which rectifier element is not carrying any current and the primary winding is interrupted, the field energy W is still stored in the transformer. The field energy W is essentially composed of the field energy $W_{FE}$ in the core and the field energy $W_\delta$ in the air gap as follows, $$W = \tfrac{1}{2}\int H^*B^*\Delta V \approx W_{FE} + W_\delta = H_{FE}*B_{FE}*V_{FE} + \tfrac{1}{2}H_\delta*B_\delta*V_\delta.$$

The field energy W is reduced through secondary winding W2 to such an extent that essentially another turn-on transient results in response to the next activation of the rectifier element.

Magnetic flux density B is constant and is approximately of the same magnitude ($B \approx B_{FE} \approx B_\delta$) in the air gap and in the ferrite. The magnetic field strength H is not constant, but is greater by a factor of μr in the air gap than in the ferrite.

In this state, magnet frame JK with secondary winding W2 appears as a storage choke. In a storage choke, which can be implemented according to the invention, the magnetic circuit of the ferrite core is often interrupted by an air gap d. The energy stored in the storage choke is then located almost completely within this air gap d. Core K functions only to carry the magnetic field. Air gap d functions to reduce the magnetic flux density B. This prevents saturation of the core material and ensures a linear inductance characteristic even in response to high magnetization.

FIG. 7a shows the characteristic curve for primary voltage U1 and for primary current I1 transmitted within the positive half-wave. The primary current I1 is composed of magnetization current $I_M$ and compensation current I2'. FIG. 7a shows that magnetization current $I_M$ and compensation current I2' cancel each other out at time $t_0$, while primary current I1 becomes zero at this instant before primary voltage U1 passes through zero at time n. Rectifier element D thus blocks even before the zero passage of primary voltage U1, and for this reason more than half a cycle duration of primary voltage U1 is available for the relaxation of the magnetic system. Time $t_0$ and thus the response of the device can also be further modified by appropriate sizing of air gap d.

FIG. 7b shows the corresponding characteristic curve for primary current I1 and for secondary current I2 that always form the identical polarity and due to the flux deviation described in the introduction rise from a maximum of ±2OΦ to double the value.

FIG. 8 shows a device according to the invention comprising two transformers T1, T2, the primary windings $W_{11}$, $W_{12}$ of which are each connected through rectifier element D1, D2 to AC voltage source Q, and the secondary windings $W_{21}$, $W_{22}$ of which are connected to load Z such that secondary currents I2 carried in alternating fashion therein for the associated half-waves run in the same direction through load Z. The two rectifier elements D1, D2—these are semiconductor diodes in this embodiment—can be connected at the cathodes to the associated primary winding $W_{11}$ or $W_{12}$, and at the anode to various leads PL1 or PL2 of power supply leads PL. Rectifier elements D1, D2 thus carry primary currents I1 in alternating fashion through primary windings $W_{11}$, $W_{12}$ such that the secondarily generated pulses, which are fed with correct polarity to load Z, complete each other to form a chain of pulses of identical polarity. It is obvious to the person skilled in the art that polarity reversal can be implemented in various ways on the primary side or secondary side so as to enable rectified pulses having the first or second polarity to be easily generated. For purposes of changing the transformation ratio, and thus change the magnitude of the generated DC voltage, the primary winding and/or the secondary winding can be provided with taps to which a primary voltage can be selectively fed or at which a secondary voltage can be selectively tapped.

FIG. 9 shows a transformer $T_{1P2}$ comprising two primary windings $W_{11}$, $W_{12}$ provided on a common core that are each connected through rectifier element D1 or D2 to AC voltage source Q and disposed on a common magnet frame JK of transformer $T_{1P2}$ in such a way that one primary current I1 is carried in alternating fashion with each AC voltage half-wave of corresponding polarity in each of primary windings $W_{11}$, $W_{12}$. The primary current I1 drives associated magnetic flux Φ always in the same direction through the magnetic circuit or magnet frame JK. The two controllable rectifier elements D1 and D2 are connected by the anode or the cathode to first lead PL1 of power supply lead PL, and by the cathode or the anode to one end of associated primary windings $W_{11}$ or $W_{12}$. The other ends of the windings are connected in common to second lead PL2 of power supply lead PL. In contrast to the solution of FIG. 8, only one magnet frame JK is required in this embodiment of the invention. On the other hand, power loss is reduced in the solution of FIG. 8. In addition, the solution of FIG. 8 can be implemented with significantly smaller gaps between carried primary currents I1, if controllable rectifier elements D are provided to electronically control the effect of the gaps.

The invention can be applied in an especially simple and advantageous manner to three-phase systems. FIG. 10 shows a three-phase transformer $T_{3P1}$ comprising three primary windings $W_{1R}, W_{1S}, W_{1T}$, each first end of which is connected through rectifier elements $D_R$ or $D_S$ or $D_T$ to an associated phase R, S, T, and each second end of which is connected to neutral conductor 0 of three-phase lead PL3. The secondary windings $W_{2R}, W_{2S}, W_{2T}$ are connected to load Z in such a way that secondary currents $I_{2R}, I_{2S}$, and $I_{2T}$ carried in alternating fashion in secondary windings $W_{2R}, W_{2S}, W_{2T}$ run always in the same direction through load Z. Each of rectifier elements $D_R$ or $D_S$ or $D_T$ is connected by its anode to associated phase R, S, T of three-phase lead PL3, connected by its cathode to the associated primary winding $W_{1R}, W_{1S}, W_{1T}$, and by its control electrode $cl_R, cl_S, cl_T$ to an associated output of a control unit CTRL by means of which, for example, a phase-fired control is implementable. Secondary windings $W_{2R}, W_{2S}, W_{2T}$ are connected in parallel and transmit pulses of identical polarity to load Z. The pulses are smoothed in an input-side-connected filter circuit SS that, for example, has a filter choke LS connected in series to load Z and/or a charging capacitor $C_L$ connected in parallel to load Z.

FIG. 11a shows characteristic curve for primary voltage U1 set by phase-fired control and corresponding primary current I1 for any of the above-described devices that are provided with phase-fired control. Rectifier elements $D_R, D_S$ or $D_T$ thus do not start to conduct right at the onset of the corresponding half-wave of voltage U1 but instead start to conduct only after receiving a control signal, and thus only with a delay p. FIG. 11b shows the characteristic curves, corresponding to primary current I1 of FIG. 11a, for secondary voltage U2 and secondary current I2.

FIG. 12a shows the characteristic curve for primary currents $I1_R, I1_S, I1_T$ set by phase-fired control in primary windings $W_{1R}, W_{1S}, W_{1T}$ of transformer $T_{3P1}$ in FIG. 10. FIG. 12b shows the characteristic curve for voltage $U_Z$ across load resistance Z in FIG. 10.

FIG. 13 shows a transformer $T_{3P2}$ comprising three pairs of primary windings $W_{11R}, W_{12R}$ or $W_{11S}, W_{12S}$ or $W_{11T}, W_{12T}$, each first end of which is connected through associated rectifier element $D_{R1}, D_{R2}$ or $D_{S1}, D_{S2}$ or $D_{T1}, D_{T2}$ to a phase R, S, T, and the second end of which is connected to neutral conductor 0 of three-phase lead PL3, and comprising secondary windings $W_{2R}, W_{2S}, W_{2T}$, that are connected to load Z such that secondary currents $I_{2R}, I_{2S}, I_{2T}$ always run in alternating fashion in secondary windings $W_{2R}, W_{2S}, W_{2T}$.

The pairs of primary windings $W_{11R}, W_{12R}$ or $W_{11S}, W_{12S}$ or $W_{11T}, W_{12T}$ are connected in series and connected through the coupling point to neutral conductor 0 of three-phase lead PL3. The free ends of primary windings $W_{11R}, W_{12R}$ or $W_{11S}, W_{12S}$ or $W_{11T}, W_{12T}$, on the other hand, are connected through rectifier elements $D_{R1}, D_{R2}$ or $D_{S1}, D_{S2}$ or $D_{T1}, D_{T2}$ to associated phase R, S, T of three-phase lead PL3, where first rectifier element $D_{R1}$ or $D_{S1}$ or $D_{T1}$ is connected by the anode, and second rectifier element $D_{R2}$ or $D_{S2}$ or $D_{T2}$ is connected by the cathode, to the associated phase R, S, T of three-phase lead PL3. The primary windings and secondary windings associated with each other $W_{11R}, W_{12R}, W_{2R}$ or $W_{11S}, W_{12S}, W_{2S}$ or $W_{11T}, W_{12T}, W_{2T}$ are each disposed here on a separate core $K_R, K_S, K_T$ of the magnet frame. In principle, three-phase transformer $T_{3P2}$ can also be composed of single-phase transformers $T_{1P2}$, as used in the above-described devices.

In the device shown in FIG. 13, each preferably controllable rectifier element $D_{R1}; D_{R2}; D_{S1}; D_{S2}; D_{T1}; D_{T2}$ conducts for a half-wave of each of the three phases R, S, T, with the result that six pulses are transmitted.

FIG. 14a shows the characteristic curve for primary currents $I1_{R1}, I1_{S1}, I1_{T1}, I1_{R2}, I1_{S2}, I1_{T2}$ set by phase-fired control in primary windings $W_{11R}, W_{12R}$ or $W_{11S}, W_{12S}$ or $W_{11T}, W_{12T}$ of transformer $T_{3P2}$ shown in FIG. 13. FIG. 14b shows the already smoothed characteristic curve for voltage $U_Z$ across load resistance Z shown in FIG. 13.

What is claimed is:

1. A device for generating a DC voltage or a DC current, comprising:
   at least one rectifier element including a control input connected to a control unit the rectifier element being controllable by the control unit in such a way that phases of half-waves to be transmitted of identical polarity are partially cut off; and
   at least one transformer that has at least one primary winding to be connected through leads from a power supply lead to an AC voltage source and at least one secondary winding connected to a load, the windings being disposed on an associated magnet frame that functions to carry a magnetic flux,
   wherein the primary winding is connected through the at least one rectifier element to the AC voltage source such that for each AC half-wave of corresponding polarity, a primary current can be carried through the rectifier element and through the primary winding, the primary current always driving the magnetic flux through the magnet frame in the same direction
   thus providing a direct voltage on the secondary winding that is connected to the load without a rectifier element in a connection path between the secondary winding and the load.

2. The device according to claim 1, wherein two primary windings are each connected through the at least one rectifier element to the AC voltage source and disposed on the magnet frame of the transformer such that the primary current is carried in each primary winding with each AC half-wave of corresponding polarity, the primary current driving the associated magnetic flux through the magnet frame in each case in the same direction, 3. The device according to claim 1, wherein two primary windings are connected through one rectifier element to the AC voltage source and are disposed on two separate magnet frames, and two secondary windings each disposed on one of the two separate magnet frames are connected to the load such that secondary currents carried in alternating fashion for the associated half-waves run through the load in the same direction.

4. The device according to , claim 2, wherein
   a) the primary windings are each connected at a first end in each case through differently poled rectifier elements to a first lead of the power supply lead, and at a second end of the primary windings to a second lead of the power supply lead, or
   b) the primary windings are each connected at a first end in each case through identically poled rectifier elements, and at a second end of the primary windings to different leads of the power supply lead 5. The device according to claim 1, wherein the transformer has three primary windings, each first end of which is connected through the associated rectifier element to a phase of a three-phase lead, and each second end of which is connected to a neutral conductor of the three-phase lead, and the transformer has secondary windings coupled to the primary windings, the secondary windings being connected to the load such that secondary currents being carried in alternating fashion in the secondary windings always run through the load in the same direction.

6. The device according to claim 1, wherein the transformer has three pairs of primary windings each first end of which is connected through the associated rectifier element to a phase of a three-phase lead, and each second end of which is connected to a neutral conductor of the three-phase lead, and the transformer has secondary windings magnetically coupled to the primary windings, the secondary windings being connected to the load such that secondary currents carried in alternating fashion in the secondary windings always run in the same direction through the load.

7. The device according to claim 6, wherein the primary windings and secondary windings coupled to each other are each disposed on a core of the associated magnet frame.

8. The device according to claim 1, wherein the magnet frame having at least one yoke or core, includes an air gap that is selected such that the field strength in the core never exceeds a designated value.

9. The device according to claim 1, Wherein the rectifier element being controllable by the control unit in such a way that individual half-waves of identical polarity are transmitted periodically or not transmitted as required.

10. The device according to claim 9, wherein the rectifier element is a controllable semiconductor.

11. The device according to claim 1, wherein the secondary winding is connected to the load through an active or passive filter circuit that has at least one component, optionally a choke connected in series and/or a charging capacitor connected in parallel to the load.

12. The device according to claim 1, wherein the transformation ratio of the transformer is modifiable, 13. A method of generating a DC voltage or a DC current with a device according to claim 1, that is connected to a single-phase or multi-phase AC voltage source and has at least one rectifier element including a control input connected to a control unit, and at least one transformer for the purpose of converting electrical energy, comprising:

the rectifier clement being controlled by the control unit in such a way that phases of half-waves to be transmitted of identical polarity are partially cut off;

delivering with each rectifier element half-waves of identical polarity either periodically or as required to the associated primary winding; and feeding the half-waves by the associated secondary winding with correct polarity to the load without intermediate application to a rectifier.

* * * * *